(12) United States Patent
Tian

(10) Patent No.: US 11,165,284 B2
(45) Date of Patent: Nov. 2, 2021

(54) WIRELESS CHARGER TOPOLOGY SYSTEMS AND METHODS

(71) Applicant: Intel Corporation, Santa Clara, CA (US)

(72) Inventor: Yanbo Tian, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 15/197,419

(22) Filed: Jun. 29, 2016

(65) Prior Publication Data

US 2018/0006501 A1 Jan. 4, 2018

(51) Int. Cl.
| | |
|---|---|
| *H02J 7/00* | (2006.01) |
| *H02J 50/40* | (2016.01) |
| *H02J 50/05* | (2016.01) |
| *H02J 50/12* | (2016.01) |
| *H02J 7/02* | (2016.01) |

(52) U.S. Cl.
CPC ............. *H02J 50/40* (2016.02); *H02J 7/007* (2013.01); *H02J 7/025* (2013.01); *H02J 50/05* (2016.02); *H02J 50/12* (2016.02); *H02J 7/00034* (2020.01)

(58) Field of Classification Search
USPC ........................................................ 320/108
See application file for complete search history.

(56) References Cited

U.S. PATENT DOCUMENTS

| | | | | |
|---|---|---|---|---|
| 5,745,276 | A * | 4/1998 | Ho ..................... | H04B 10/6931 250/214 A |
| 6,249,687 | B1 * | 6/2001 | Thomsen ................ | H01P 1/213 375/316 |
| 8,532,724 | B2 | 9/2013 | Cook et al. | |
| 2010/0172168 | A1 | 7/2010 | Fells | |
| 2010/0188164 | A1 * | 7/2010 | Blednov ................ | H03H 7/383 333/109 |
| 2013/0200721 | A1 * | 8/2013 | Kurs .................... | H04B 5/0037 307/104 |
| 2014/0103869 | A1 * | 4/2014 | Radovic ................. | H02J 5/005 320/108 |
| 2014/0191585 | A1 * | 7/2014 | Gulak ................. | H01F 27/2804 307/104 |
| 2014/0340031 | A1 | 11/2014 | Mi et al. | |

(Continued)

FOREIGN PATENT DOCUMENTS

WO    2018004923    1/2018

OTHER PUBLICATIONS

"International Application Serial No. PCT/US2017/034960, International Search Report dated Aug. 18, 2017", 3 pgs.

(Continued)

*Primary Examiner* — Samuel Berhanu
(74) *Attorney, Agent, or Firm* — Schwegman Lundberg & Woessner, P.A.

(57) ABSTRACT

Wireless charging of electronic devices often requires active adjustment of impedance and power level during charging. Technical solutions described herein provide systems and methods for adjusting the impedance measured at the power amplifier according to the output power level. In particular, the power amplifier impedance decreases as the power output increases, and the power amplifier impedance increases as the power output decreases. In an embodiment, the impedance adjustment includes the addition of a phase shifter.

16 Claims, 6 Drawing Sheets

(56) References Cited

U.S. PATENT DOCUMENTS

| | | |
|---|---|---|
| 2015/0061577 A1 | 3/2015 | Ye et al. |
| 2015/0208180 A1 | 7/2015 | Martius et al. |
| 2015/0263530 A1 | 9/2015 | Tsuda et al. |
| 2015/0280443 A1 | 10/2015 | Vladan et al. |
| 2015/0280444 A1* | 10/2015 | Smith .................... H02J 17/00 307/104 |
| 2016/0118845 A1* | 4/2016 | Yeo ........................ H02J 50/12 320/108 |
| 2016/0181822 A1* | 6/2016 | Yang ...................... H02J 5/005 307/104 |
| 2017/0179729 A1* | 6/2017 | Porat ...................... H02J 50/12 |
| 2017/0288445 A1* | 10/2017 | Lee ........................ H02J 7/025 |

OTHER PUBLICATIONS

"International Application Serial No. PCT/US2017/034960, Written Opinion dated Aug. 18, 2017", 6 pgs.

Berger, Andreas, et al., "Phase-Shift arid Amplitude Control for an Active Rectifier to Maximize the Efficiency and Extracted Power of a Wireless Power Transfer System", IEEE Applied Power Electronics Conference and Exposition, (2015), 5 pgs.

* cited by examiner

WIRELESS CHARGER TOPOLOGY SYSTEMS AND METHODS

TECHNICAL FIELD

Embodiments described herein generally relate to wireless charging of electronic devices via resonant inductive coupling.

BACKGROUND

There is an increasing demand for wireless charging (e.g., resonant charging, inductive charging) of electronic devices, such as wireless charging of portable electronic devices. Existing solutions for wireless charging may include a charging station and an electronic device. The charging station generates an electromagnetic field to charge the electronic device wirelessly.

During wireless charging via resonant inductive coupling, when the power transfer to the electronic device increases, the wireless charge transfer impedance at the charging station increases. This is challenging for designing the power amplifier within the charging station, as an increase in impedance at the power amplifier decreases the power output from the power amplifier. In particular, the power output from the power amplifier is inversely proportional to the load impedance, such as shown in equation (1) below:

$$P \propto \frac{Vcc^2}{R} \quad (1)$$

For a given voltage Vcc provided by the power amplifier, the output power increases with a decreasing load impedance. As described above, this is contrary to the charging condition, in which increased wireless power consumption is accompanied by an increase in wireless charge transfer impedance.

Some existing solutions for addressing the change in power requirements include using an active charging configuration. For example, an active charging solution may detect and respond to an increased power output requirement by increasing the voltage output from the power amplifier within the charging station. However, such active charging solutions require increased complexity and additional components, such as requiring a power detection component. Additionally, the active power changes may damage or reduce the long-term reliability of the wireless charging components.

It is desirable to provide an improved solution for wireless charging for electronic devices.

DESCRIPTION OF EMBODIMENTS

A technical problem faced when wirelessly charging electronic device via resonant inductive coupling is managing impedance and power level during charging. Technical solutions described herein provide systems and methods for providing a desired impedance as measured at the power amplifier according to the output power level. In particular, the power amplifier impedance decreases as the power output increases, and the power amplifier impedance increases as the power output decreases. In an embodiment, the impedance adjustment includes the addition of a phase shifter, as shown and described below.

The following description and the drawings sufficiently illustrate specific embodiments to enable those skilled in the art to practice them. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
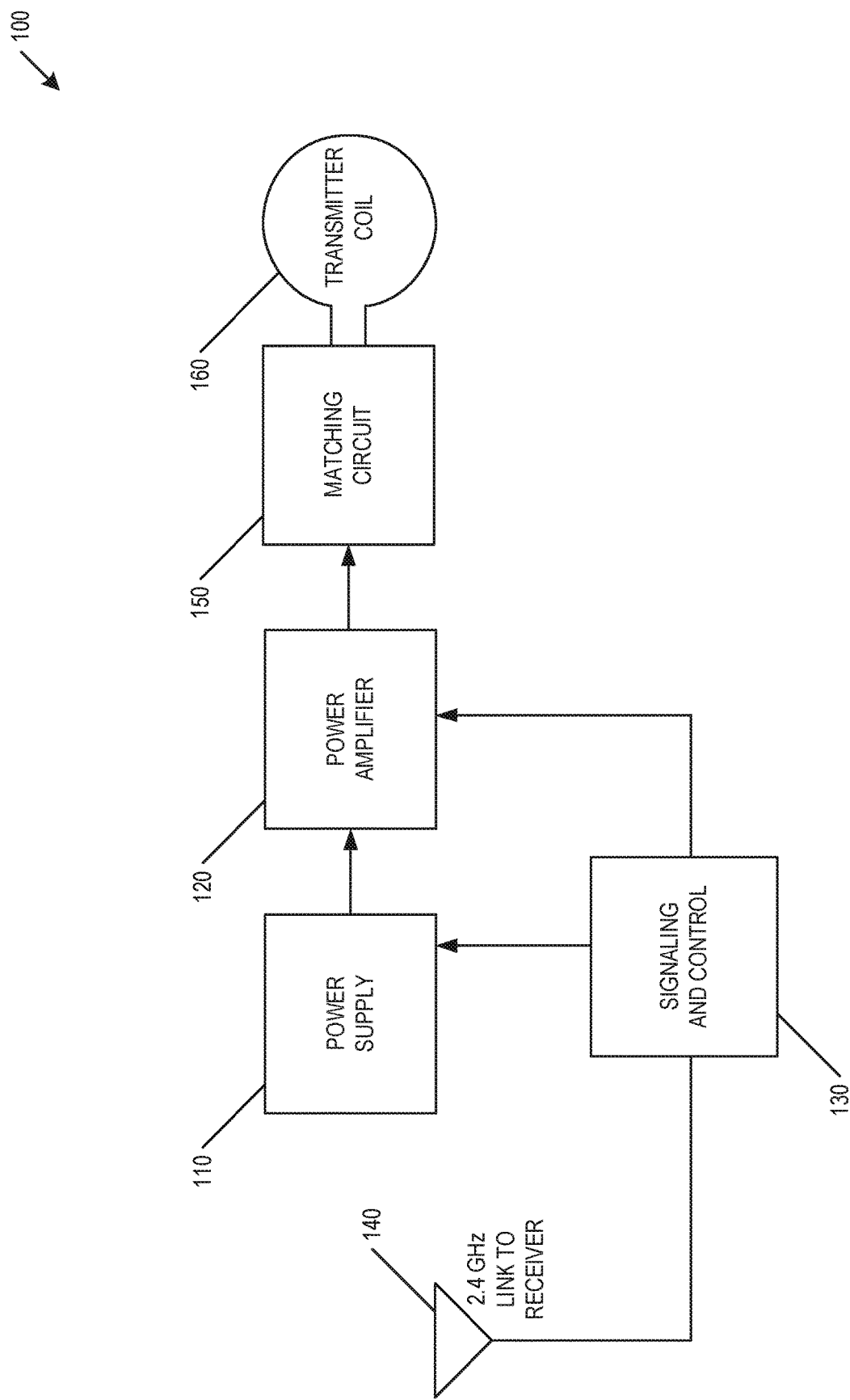
FIG. 1 is a block diagram of a wireless charging topology, in accordance with at least one embodiment of the invention.

FIG. 1 is a block diagram of a wireless charging topology 100, in accordance with at least one embodiment of the invention. Wireless charging topology 100 includes a power supply 110 that supplies power to a power amplifier 120. Both the power supply 110 and power amplifier 120 receive control signals from the signaling and control block 130. The signaling and control block 130 is capable of sending and receiving control signals and other signals using a wireless link 140. Wireless link 140 may use any wireless protocol, such as Near-Field Communications (NFC), Bluetooth, Bluetooth Low-Energy (BLE), Wi-Fi, cellular communications, or other wireless protocol. Wireless link 140 may be used to communicate charging information between the signaling and control block 130 and an electronic device to be charged. For example, charging information may indicate an increased level of charge is required by the electronic device to be charged, and the signaling and control block 130 may respond by sending signals to the power supply 110 or power amplifier 120 to increase the provided voltage or current. The power amplifier 120 may provide amplified power to a matching circuit 150, where the matching circuit 150 provides the matched amplified power to a transmitter coil 160. The matching circuit 150 may include a static circuit network designed to substantially match the impedance of the transmitter coil 160, such as the example matching network shown in FIG. 2.

Figure 2:
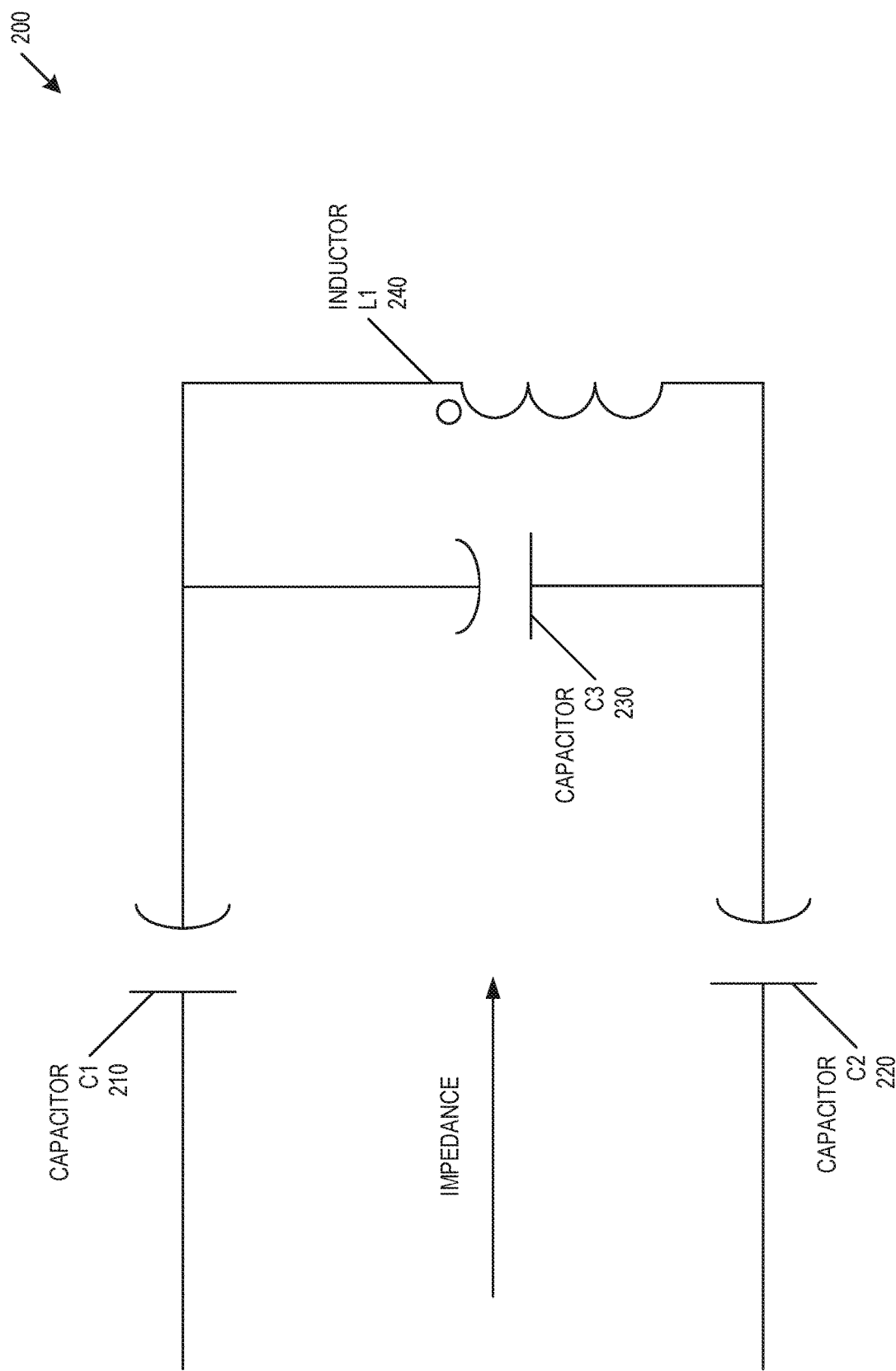
FIG. 2 is a block diagram of an example matching network, in accordance with at least one embodiment of the invention.

FIG. 2 is a block diagram of an example matching network 200, in accordance with at least one embodiment of the invention. Matching network 200 may be used as the matching circuit 150 shown in FIG. 1. Matching network 200 may include a first capacitor C1 210, a second capacitor C2 220, and a third capacitor C3 230. The first, second, and third capacitors 210, 220, and 230 may be arranged in series. Matching network 200 may also include an inductor L1 240 in parallel with the third capacitor C3 230. The first, second, and third capacitors 210, 220, and 230 may have individual capacitor values selected based on a desired matching topology. In various embodiments, the elements within the matching network 200 are selected to result in an impedance that is primarily or exclusively a real impedance, with little or no associated imaginary impedance.

In various embodiments, the capacitors 210, 220, or 230 and inductor 240 vary impedance or reactance actively to improve the ability of the matching network 200 to provide power with an associated inductance that is primarily or completely real (i.e., a power that includes a reduced or minimal imaginary inductance). In various low-power embodiments, such as those associated with portable electronic devices, the matching network 200 is able to tolerate (e.g., compensate for) variations in impedance or reactance, and therefore to provide a simpler design for a matching network 200.

Figure 3:
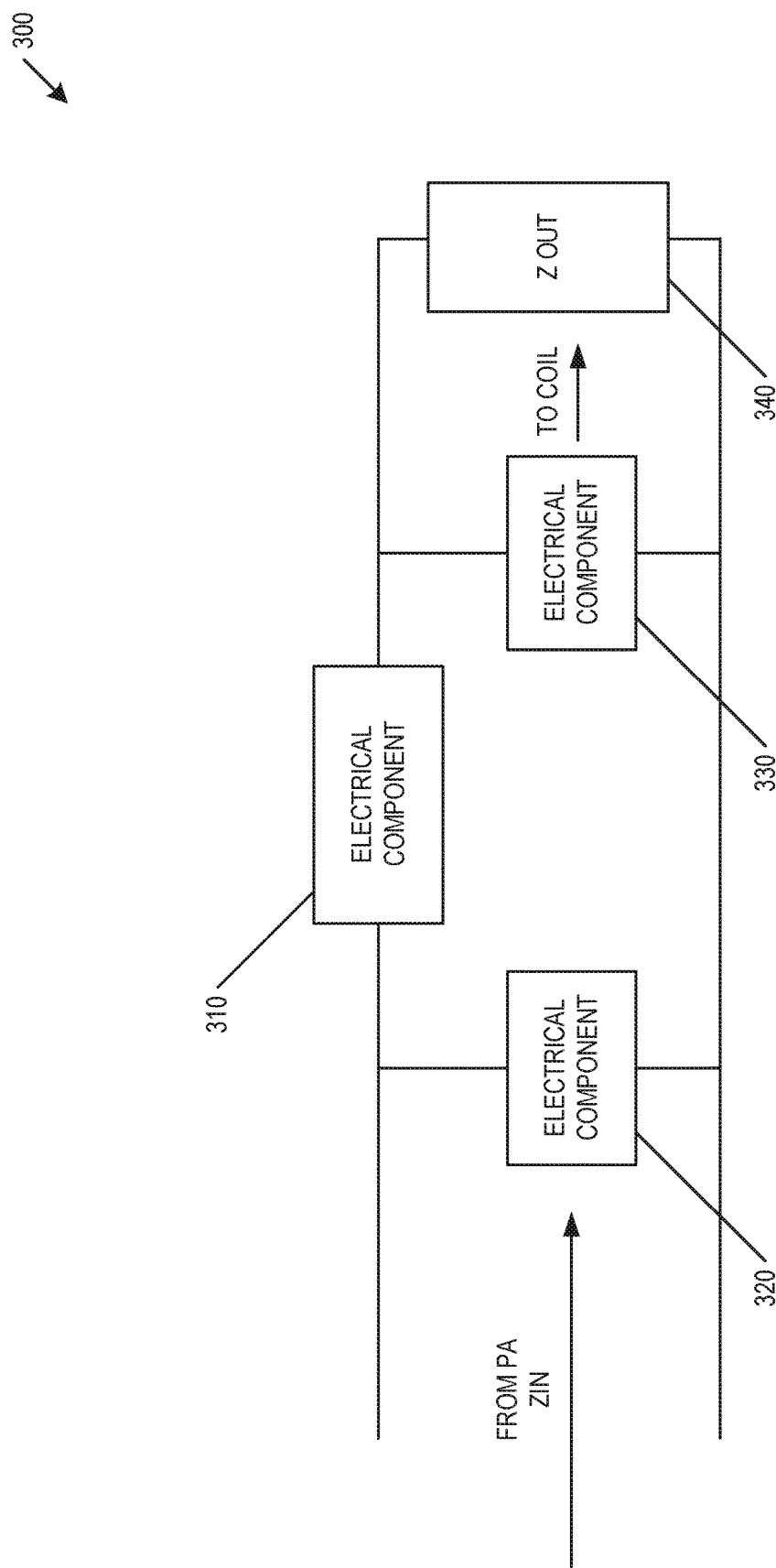
FIG. 3 is a block diagram of an example phase-shifted p network, in accordance with at least one embodiment of the invention.

FIG. 3 is a block diagram of an example phase-shifted π network 300, in accordance with at least one embodiment of the invention. In contrast with solutions that actively adjust the voltage provided by a power amplifier, the phase-shifted π network 300 provides a phase shift of 180 degrees (e.g., π radians). The relationship between input impedance Zin and output impedance Zout are related to the character impedance of the network $Z_0$, as described by equation (2) below:

$$z_{in} \cdot z_{out} = z_0^2 \quad (2)$$

The expression in equation (2) may be realized using a quarter-wavelength transmission line or an equivalent lump network. However, wireless charging at or around 6.78 MHz has a corresponding wavelength of 44.217 meters, and a corresponding quarter-wavelength transmission line longer than 11 meters is impractical to implement in a wireless charging device. In an example, the phase-shifted π network 300 provides a practical implementation in the form of an equivalent lump network.

Phase-shifted π network 300 may include a first electrical component 310, a second electrical component 320, and a third electrical component 330. The second and third electrical components 320 and 330 may be connected in parallel on each side of the first electrical component 310, thereby forming a "π network" (e.g., π-shaped) configuration. The impedance of the second and third electrical components 320 and 330 may be selected to be a first inductive value $-Z_0$, and the first electrical component 310 may be selected to be a second inductive value $Z_0$. In an embodiment, the first electrical component 310 represents an inductor with associated impedance $Z_0$, and second and third electrical components 320 and 330 represent capacitors with associated impedance $-Z_0$. In another embodiment, the first electrical component 310 represents a capacitor with associated impedance $-Z_0$, and second and third electrical components 320 and 330 represent inductors with associated impedance $Z_0$. These embodiments provide a 180 degree phase shift (e.g., π radian phase shift), which actively adjusts the voltage provided by the power amplifier according to equation (2).

These embodiments provide various additional features. For example, the capacitors provide a signal shunting that reduces the leaked harmonic components of the signal, and provides improved electromagnetic interference (EMI) mitigation. In another example, the inductors pass low-frequency direct-current (DC) while the capacitors provide a high-frequency shunting, such as for shunting high-frequency power ripple created by conventional power sources.

When arranged in this configuration, the π network 300 phase-shifts power received from the power amplifier, and provides this phase-shifted power to the inductive coil, represented by Zout 340. The coil Zout 340 is used to generate an alternating magnetic field used for wirelessly charging an electronic device via resonant inductive coupling. A similar 180-degree phase shift may be provided by a "T network," such as shown in FIG. 4.

Figure 4:
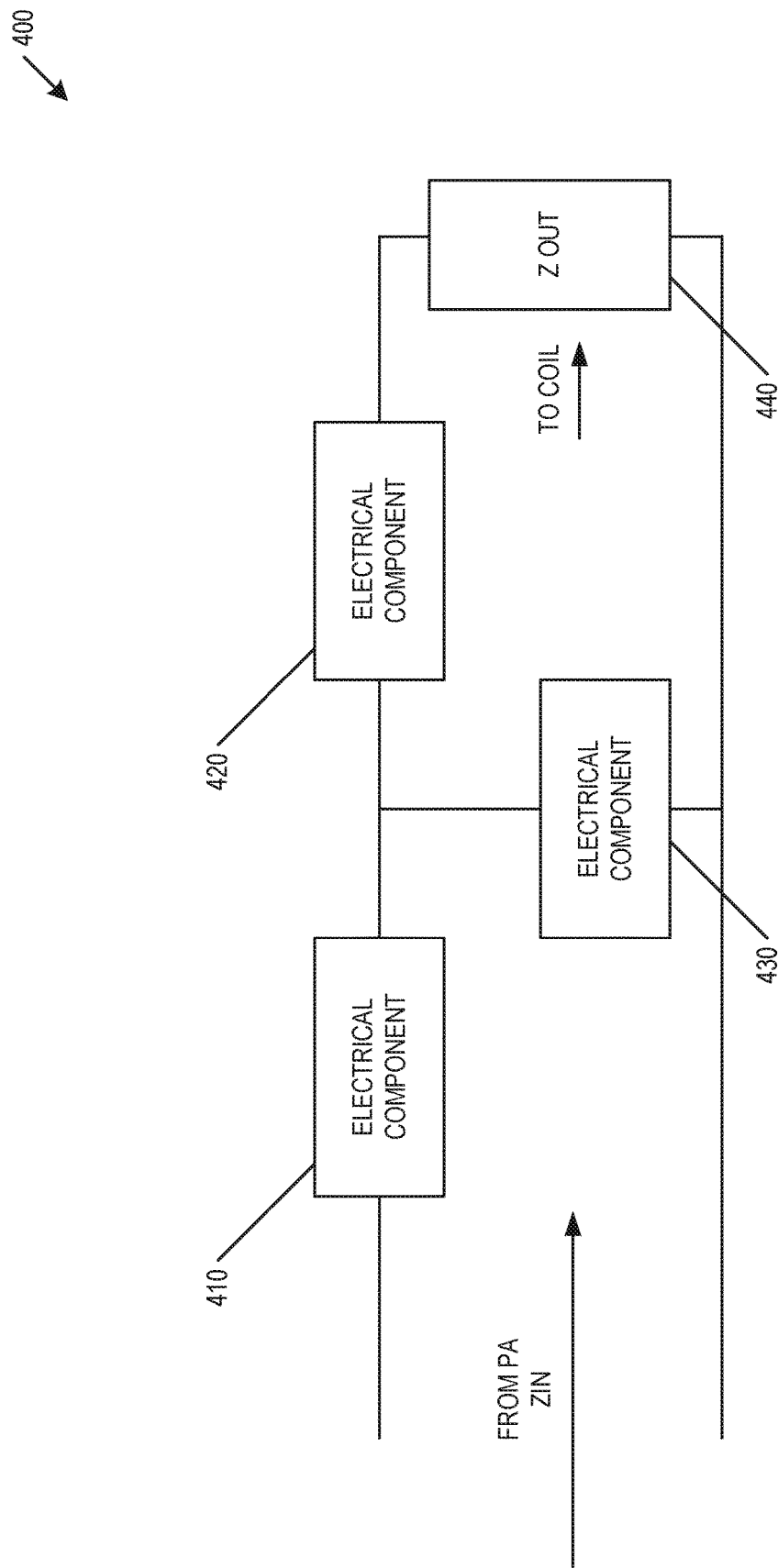
FIG. 4 is a block diagram of an example phase-shifted T network, in accordance with at least one embodiment of the invention.

FIG. 4 is a block diagram of an example phase-shifted T network 400, in accordance with at least one embodiment of the invention. Phase-shifted T network 400 may include a first electrical component 410, a second electrical component 420, and a third electrical component 430. The first and second electrical components 410 and 420 may be connected in series with the third electrical component 430 connected in parallel, thereby forming a "T network" (e.g., T-shaped) configuration. The impedance of the first and second electrical components 410 and 420 may be selected to be a first inductive value $-Z_1$, and the third electrical component 430 may be selected to be a second inductive value $Z_1$. In an embodiment, the first and second electrical components 410 and 420 represent inductors with associated impedance $-Z_1$, and the third electrical component 430 represents a capacitor with associated impedance $Z_1$. This provides a 180 degree phase shift (e.g., π radian phase shift), which actively adjusts the voltage provided by the power amplifier according to equation (2). When arranged in this configuration, the T network 400 phase-shifts power received from the power amplifier, and provides this phase-shifted power to the inductive coil, represented by Zout 440. The coil Zout 440 is used to generate an alternating magnetic field used for wirelessly charging an electronic device via resonant inductive coupling.

The example phase-shifted T network 400 may be determined based on the impedances of the electrical components included in the phase-shifted π network 300 by converting the π network components to the T network according to equations (3) and (4):

$$-z_1 = \frac{(-z_0)(z_0)}{-z_0 - z_0 + z_0} \quad (3)$$

$$z_1 = \frac{(-z_0)(-z_0)}{-z_0 - z_0 + z_0} \quad (4)$$

Similarly, the example phase-shifted π network 300 may be determined based on the impedances of the electrical components included in the phase-shifted T network 400 by converting the T network components to the π network according to equations (5) and (6):

$$-z_0 = \frac{(-z_1)(-z_1) + (-z_1)(z_1) + (-z_1)(z_1)}{-z_1} \quad (5)$$

$$z_0 = \frac{(-z_1)(-z_1) + (-z_1)(z_1) + (-z_1)(z_1)}{z_1} \quad (6)$$

Note the common numerator in equation (5) and equation (6), which may be used to reduce computational complexity.

Figure 5:
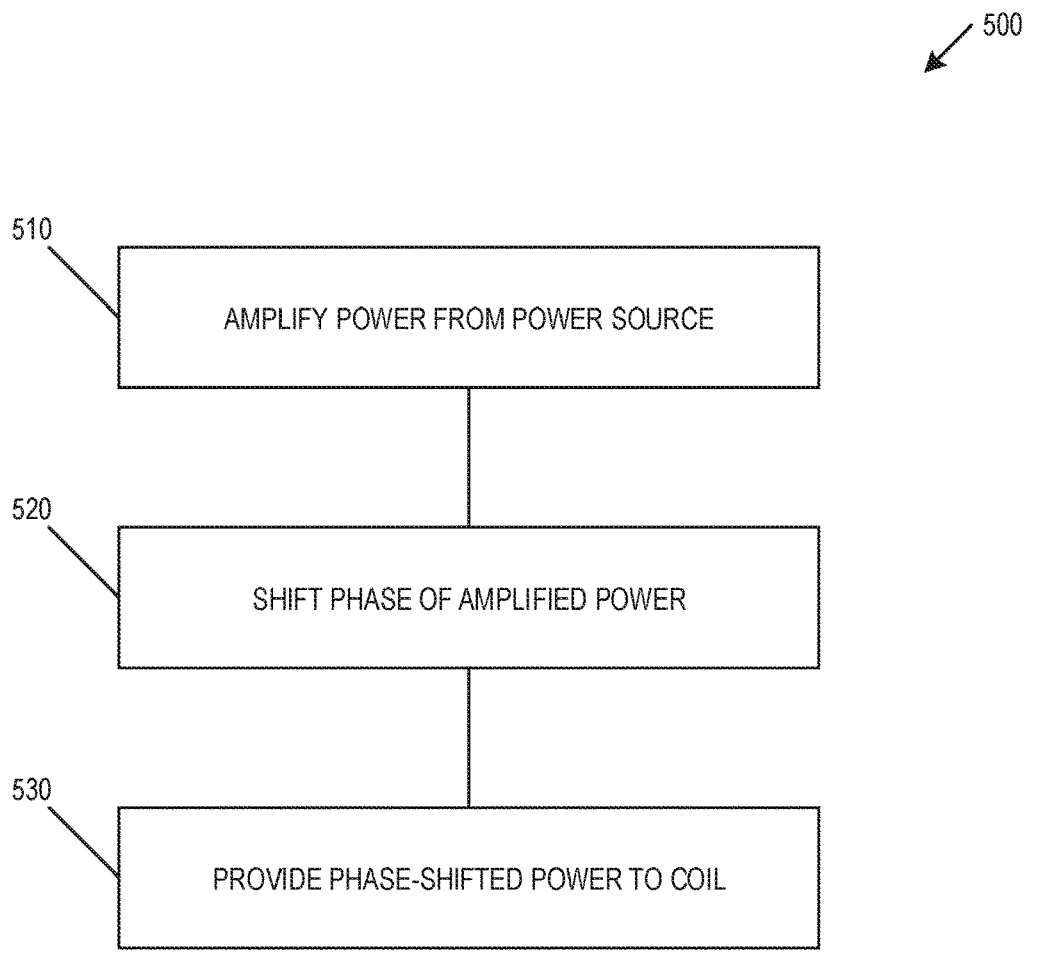
FIG. 5 is a block diagram illustrating method for providing wireless power, in accordance with at least one embodiment of the invention.

FIG. 5 is a block diagram illustrating method 500 for providing wireless power, in accordance with at least one embodiment of the invention. Method 500 may include amplifying power from a power source 510. The amplified power may be phase-shifted 520 from the amplified power. In various embodiments, the amplified power may be phase-shifted by 180 degrees. The phase-shifted power may be applied 530 to a coil to generate an alternating electromagnetic field for wirelessly charging a portable electronic device. In various embodiments, the power amplification may be modified adaptively by the power adapter, the power adapter components, or by an active power amplification configuration.

Figure 6:
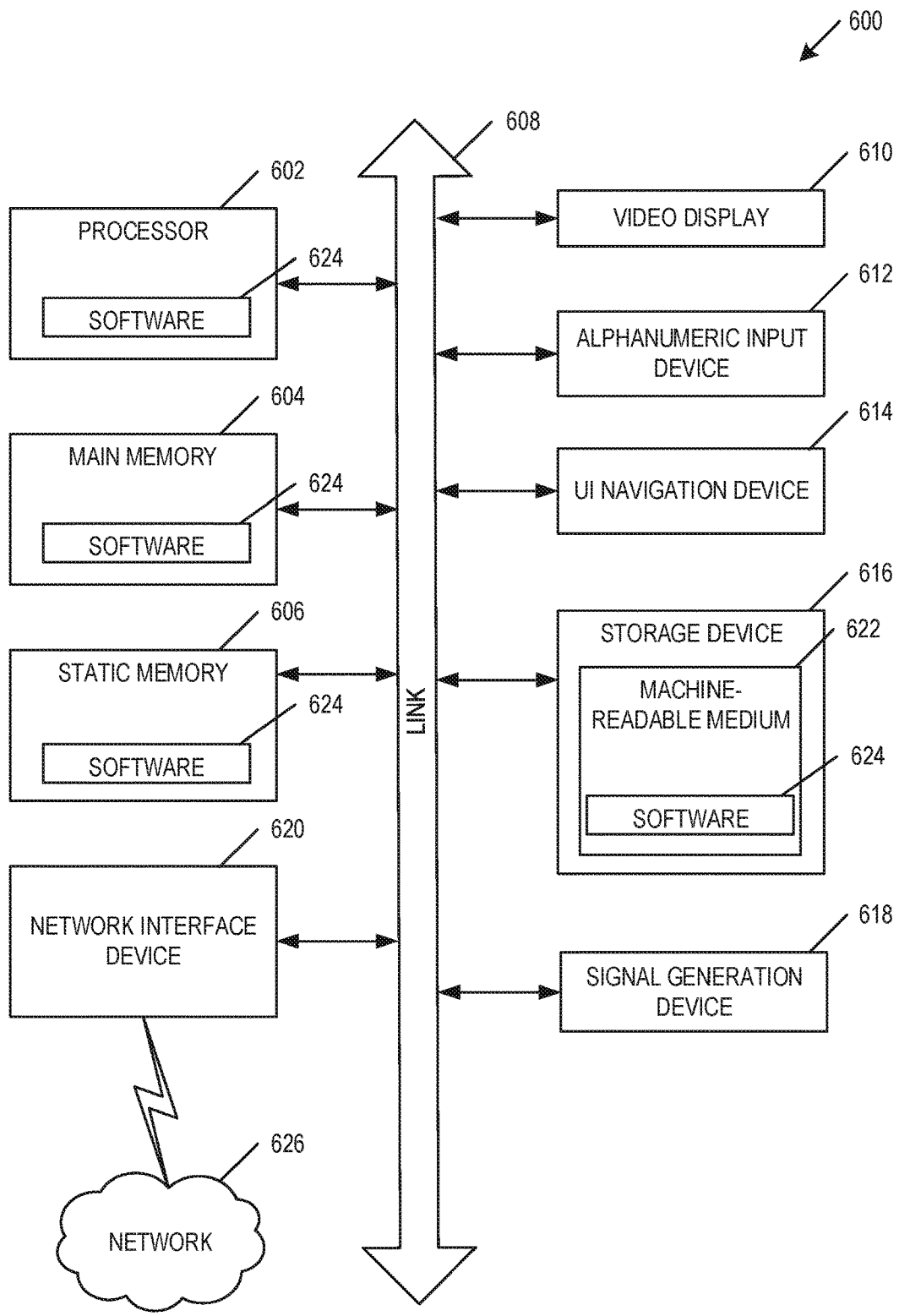
FIG. 6 is a block diagram illustrating an active wireless charger in the example form of a computer system, in accordance with at least one embodiment of the invention.

FIG. 6 is a block diagram illustrating a wireless charger in the example form of a computer system 600, within which a set or sequence of instructions may be executed to cause the machine to perform any one of the methodologies discussed herein, according to an example embodiment. Computer system 600 may also represent the host shown in FIGS. 4-5, where the wireless charger and host are connected wirelessly or via a wired connection to exchange or process wireless charging control data. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an integrated circuit (IC), a portable electronic device, a personal computer (PC), a tablet PC, a hybrid tablet, a personal digital assistant (PDA), a mobile telephone, or any machine capable of executing instructions (sequential or otherwise) that specify actions to be taken by that machine to control wireless charging. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, Near-Field Communications (NFC), Bluetooth, Bluetooth LE, 3G, 4G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here:

Example 1 is a wireless charging apparatus comprising: a power supply; a power amplifier to receive power from the power supply and to generate an amplified power; a matching circuit to receive the amplified power and to phase-shift the amplified power; and a coil to receive the phase-shifted amplified power and to generate an alternating electromagnetic field for wirelessly charging a portable electronic device via resonant inductive coupling.

In Example 2, the subject matter of Example 1 optionally includes wherein the matching circuit phase-shifts the amplified power by approximately 180 degrees.

In Example 3, the subject matter of any one or more of Examples 1-2 optionally include the matching circuit including a lumped network.

In Example 4, the subject matter of Example 3 optionally includes the lumped network including a pi network.

In Example 5, the subject matter of Example 4 optionally includes the pi network including: a first inductive element and a second inductive element, the first and second inductive elements connected in parallel with the received amplified power; and a third inductive element connected between the first and second inductive elements and connected in series with the received amplified power.

In Example 6, the subject matter of Example 5 optionally includes wherein: the first and second inductive elements include a first and second capacitor; and the third inductive element includes a first inductor.

In Example 7, the subject matter of any one or more of Examples 5-6 optionally include wherein: the first and second inductive elements include a second and third inductor; and the third inductive element includes a third capacitor.

In Example 8, the subject matter of any one or more of Examples 3-7 optionally include the lumped network including a T network.

In Example 9, the subject matter of Example 8 optionally includes the T network including: a fourth inductive element and a fifth inductive element, the fourth and fifth inductive elements connected series with the received amplified power; and a sixth inductive element connected between the fourth and fifth inductive elements and connected in parallel with the received amplified power.

In Example 10, the subject matter of Example 9 optionally includes wherein: the fourth and fifth inductive elements include a fourth and fifth capacitor; and the sixth inductive element includes a fourth inductor.

In Example 11, the subject matter of any one or more of Examples 9-10 optionally include wherein: the fourth and fifth inductive elements include a fifth and sixth inductor; and the sixth inductive element includes a sixth capacitor.

In Example 12, the subject matter of any one or more of Examples 1-11 optionally include the matching circuit including a quarter wavelength transmission line.

Example 13 is a wireless charging method comprising: receiving amplified power from a power amplifier; phase-shifting the amplified power; and providing the amplified power to a coil to generate an alternating electromagnetic field for wirelessly charging a portable electronic device via resonant inductive coupling.

In Example 14, the subject matter of Example 13 optionally includes wherein the matching circuit phase-shifts the amplified power by approximately 180 degrees.

In Example 15, the subject matter of any one or more of Examples 13-14 optionally include wherein the matching circuit includes a lumped network.

In Example 16, the subject matter of Example 15 optionally includes wherein the lumped network includes a pi network.

In Example 17, the subject matter of Example 16 optionally includes wherein the pi network includes: a first inductive element and a second inductive element, the first and second inductive elements connected in parallel with the received amplified power; and a third inductive element connected between the first and second inductive elements and connected in series with the received amplified power.

In Example 18, the subject matter of Example 17 optionally includes wherein: the first and second inductive elements include a first and second capacitor; and the third inductive element includes a first inductor.

In Example 19, the subject matter of any one or more of Examples 17-18 optionally include wherein: the first and second inductive elements include a second and third inductor; and the third inductive element includes a third capacitor.

In Example 20, the subject matter of any one or more of Examples 15-19 optionally include wherein the lumped network includes a T network.

In Example 21, the subject matter of Example 20 optionally includes wherein the T network includes: a fourth inductive element and a fifth inductive element, the fourth and fifth inductive elements connected series with the received amplified power; and a sixth inductive element connected between the fourth and fifth inductive elements and connected in parallel with the received amplified power.

In Example 22, the subject matter of Example 21 optionally includes wherein: the fourth and fifth inductive elements include a fourth and fifth capacitor; and the sixth inductive element includes a fourth inductor.

In Example 23, the subject matter of any one or more of Examples 21-22 optionally include wherein: the fourth and fifth inductive elements include a fifth and sixth inductor; and the sixth inductive element includes a sixth capacitor.

Example 24 is at least one machine-readable medium including instructions, which when executed by a computing system, cause the computing system to perform any of the methods of Examples 13-23.

Example 25 is an apparatus comprising means for performing any of the methods of Examples 13-23.

Example 26 is at least one machine-readable storage medium, comprising a plurality of instructions that, responsive to being executed with processor circuitry of a computer-controlled device, cause the computer-controlled device to: receive amplified power from a power amplifier; phase-shift the amplified power; and provide the amplified power to a coil to generate an alternating electromagnetic field for wirelessly charging a portable electronic device via resonant inductive coupling.

In Example 27, the subject matter of Example 26 optionally includes wherein the matching circuit phase-shifts the amplified power by approximately 180 degrees.

In Example 28, the subject matter of any one or more of Examples 26-27 optionally include wherein the matching circuit includes a lumped network.

In Example 29, the subject matter of Example 28 optionally includes wherein the lumped network includes a pi network.

In Example 30, the subject matter of Example 29 optionally includes wherein the pi network includes: a first inductive element and a second inductive element, the first and second inductive elements connected in parallel with the received amplified power; and a third inductive element connected between the first and second inductive elements and connected in series with the received amplified power.

In Example 31, the subject matter of Example 30 optionally includes wherein: the first and second inductive elements include a first and second capacitor; and the third inductive element includes a first inductor.

In Example 32, the subject matter of any one or more of Examples 30-31 optionally include wherein: the first and second inductive elements include a second and third inductor; and the third inductive element includes a third capacitor.

In Example 33, the subject matter of any one or more of Examples 28-32 optionally include wherein the lumped network includes a T network.

In Example 34, the subject matter of Example 33 optionally includes wherein the T network includes: a fourth inductive element and a fifth inductive element, the fourth and fifth inductive elements connected series with the received amplified power; and a sixth inductive element connected between the fourth and fifth inductive elements and connected in parallel with the received amplified power.

In Example 35, the subject matter of Example 34 optionally includes wherein: the fourth and fifth inductive elements include a fourth and fifth capacitor; and the sixth inductive element includes a fourth inductor.

In Example 36, the subject matter of any one or more of Examples 34-35 optionally include wherein: the fourth and fifth inductive elements include a fifth and sixth inductor; and the sixth inductive element includes a sixth capacitor.

Example 37 is a wireless charging apparatus comprising: means for receiving amplified power from a power amplifier; means for phase-shifting the amplified power; and means for providing the amplified power to a coil to generate an alternating electromagnetic field for wirelessly charging a portable electronic device via resonant inductive coupling.

In Example 38, the subject matter of Example 37 optionally includes wherein the matching circuit phase-shifts the amplified power by approximately 180 degrees.

In Example 39, the subject matter of any one or more of Examples 37-38 optionally include wherein the matching circuit includes a lumped network.

In Example 40, the subject matter of Example 39 optionally includes wherein the lumped network includes a pi network.

In Example 41, the subject matter of Example 40 optionally includes wherein the pi network includes: a first inductive element and a second inductive element, the first and second inductive elements connected in parallel with the received amplified power; and a third inductive element connected between the first and second inductive elements and connected in series with the received amplified power.

In Example 42, the subject matter of Example 41 optionally includes wherein: the first and second inductive elements include a first and second capacitor; and the third inductive element includes a first inductor.

In Example 43, the subject matter of any one or more of Examples 41-42 optionally include wherein: the first and second inductive elements include a second and third inductor; and the third inductive element includes a third capacitor.

In Example 44, the subject matter of any one or more of Examples 39-43 optionally include wherein the lumped network includes a T network.

In Example 45, the subject matter of Example 44 optionally includes wherein the T network includes: a fourth inductive element and a fifth inductive element, the fourth and fifth inductive elements connected series with the received amplified power; and a sixth inductive element connected between the fourth and fifth inductive elements and connected in parallel with the received amplified power.

In Example 46, the subject matter of Example 45 optionally includes wherein: the fourth and fifth inductive elements include a fourth and fifth capacitor; and the sixth inductive element includes a fourth inductor.

In Example 47, the subject matter of any one or more of Examples 45-46 optionally include wherein: the fourth and fifth inductive elements include a fifth and sixth inductor; and the sixth inductive element includes a sixth capacitor.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A wireless charging apparatus comprising:
   a power supply;
   a power amplifier to receive power from the power supply and to generate an amplified power;
   a matching circuit to receive the amplified power and to phase-shift the amplified power, the matching circuit including a quarter wavelength transmission line equivalent lumped network, the lumped network including a first inductor and a first capacitor; and
   a coil to receive the phase-shifted amplified power and to generate an alternating electromagnetic field for wirelessly charging a portable electronic device via resonant inductive coupling;
   wherein the first inductor is connected in parallel with the received amplified power and the first capacitor is connected in series between the received amplified power and the coil.

2. The apparatus of claim 1, wherein the matching circuit phase-shifts the amplified power by approximately 180 degrees.

3. The apparatus of claim 1, the lumped network including a plurality of inductive elements.

4. The apparatus of claim 3, the lumped network including a pi network.

5. The apparatus of claim 4, the pi network including:
   the first inductor and a second inductor connected in parallel with the received amplified power; and
   the first capacitor connected between the first inductor and the second inductor in series with the received amplified power.

6. The apparatus of claim 3, the lumped network including a T network.

7. The apparatus of claim 6, the T network including:
the first capacitor and a second capacitor connected series with the received amplified power; and
the first inductor connected between the first capacitor and the second capacitor in parallel with the received amplified power.

8. The apparatus of claim 1, the quarter wavelength transmission line equivalent lump network configured to operate at approximately 6.78 MHz.

9. A wireless charging method comprising:
receiving amplified power from a power amplifier;
phase-shifting the amplified power at a matching circuit, the matching circuit including a quarter wavelength transmission line equivalent lumped network, the lumped network including a first inductor and a first capacitor; and
providing the amplified power to a coil to generate an alternating electromagnetic field for wirelessly charging a portable electronic device via resonant inductive coupling;
wherein the first inductor is connected in parallel with the received amplified power and the first capacitor is connected in series between the received amplified power and the coil.

10. The method of claim 9, wherein the matching circuit phase-shifts the amplified power by approximately 180 degrees.

11. The method of claim 9, the lumped network including a plurality of inductive elements.

12. At least one machine-readable storage medium, comprising a plurality of instructions that, responsive to being executed with processor circuitry of a computer-controlled device, cause the computer-controlled device to:
receive amplified power from a power amplifier;
phase-shift the amplified power at a matching circuit, the matching circuit including a quarter wavelength transmission line equivalent lumped network, the lumped network including a first inductor and a first capacitor; and
provide the amplified power to a coil to generate an alternating electromagnetic field for wirelessly charging a portable electronic device via resonant inductive coupling;
wherein the first inductor is connected in parallel with the received amplified power and the first capacitor is connected in series between the received amplified power and the coil.

13. The machine-readable storage medium of claim 12, wherein the matching circuit phase-shifts the amplified power by approximately 180 degrees.

14. The machine-readable storage medium of claim 12, wherein the lumped network including a plurality of inductive elements.

15. The machine-readable storage medium of claim 14, wherein the lumped network includes a pi network, the pi network including:
the first inductor and a second inductor connected in parallel with the received amplified power; and
the first capacitor connected between the first inductor and the second inductor in series with the received amplified power.

16. The machine-readable storage medium of claim 14, wherein the lumped network includes a T network, the T network including:
the first capacitor and a second capacitor connected series with the received amplified power; and
the first inductor connected between the first capacitor and the second capacitor in parallel with the received amplified power.

\* \* \* \* \*